Aug. 14, 1928.
G. HEDÉN
1,680,680
BUOYING AND DRIVING MECHANISM FOR FLYING MACHINES
Filed Feb. 7, 1927
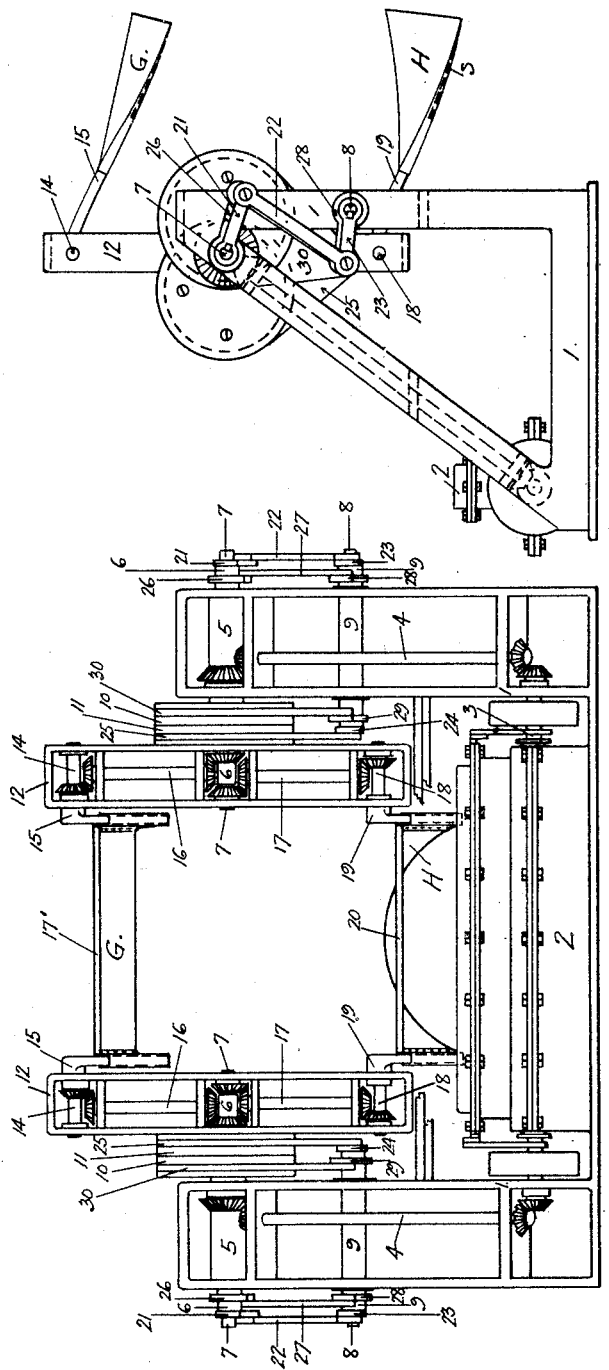
INVENTOR
BY
ATTORNEY Patented Aug. 14, 1928.

1,680,680

UNITED STATES PATENT OFFICE.

GUSTAF HEDÉN, OF NEW YORK, N. Y.

BUOYING AND DRIVING MECHANISM FOR FLYING MACHINES.

Application filed February 7, 1927. Serial No. 166,426.

This invention relates to improvements in flying machines and has for its object to provide a buoying and driving mechanism having wings carried by arms fast on horizontal and parallel arm shafts rotatably and oscillatably mounted each two on a common longitudinal axis in separate parallel transmission frames, mounted in and at each side of a body and rotatable in unison in a vertical plane by separate bevel gear and rod connections to motors, and said arm shafts at one end of said transmission frames being provided with like bevel gear and rod connections to central parallel and solid bevel gear and crank arm shafts, operated by lower parallel and also solid crank arm shafts, oscillated by inner eccentrics fast on said transmission frames, said arm shafts at opposite ends of said transmission frames having like bevel gear and rod connections to central parallel and hollow bevel gear and crank arm shafts which act as bearings for said solid bevel gear and crank arm shafts, and are operated by lower parallel and hollow crank arm shafts which act as bearings for said solid lower parallel crank arm shafts and are oscillated by outer eccentrics, fast, like inner eccentrics on said transmission frames, and thus causing the wing arms to oscillate during their rotation.

Another object is to provide certain improvements in form, construction and arrangements of the different parts whereby the above and other objects may be effectively carried out.

A practical embodiment is represented in the accompanying drawings in which

Fig. I represents in front elevation a portion of a flying machine which includes my improved construction.

Fig. II represents a side elevation of the same.

Fig. III represents in side elevation an enlarged detail view of one partially elastic wing arm with springs attached to its rear end and showing connecting holes for reinforcement wire of the front edge of the wing.

The body of the machine, denoted by 1, and in which are mounted motors 2, provides seven bearings at each side, namely one for motor bevel gear shaft 3, two for bevel gear drive 4, one for each of hollow main bevel gear shaft 5, hollow bevel gear and crank arm shaft 6, and two for hollow crank arm shaft 9.

The hollow main bevel gear shafts 5 which provide bearings within for hollow bevel gear and crank arm shafts 6 are fast on two eccentric discs 10 and 11 which are fast on outer sides of the transmission frames 12 and placed diametrically opposite on shafts 5 and at 90 degree angles to the said transmission frames 12, each of which provides two bearings at each end for wing arm shafts 14 and 18, two bearings for each of bevel gear drives 16 and 17 and, at centre, one bearing for each of solid bevel gear and crank arm shafts 7, and hollow bevel gear and crank arm shafts 6.

On wing arm shafts 14 and 18 are fast wing arms 15 and 19, resp., which are provided with springs S at their outer ends, as shown in Fig. III.

Wing G has one side fast on reinforcement wire 17' and two of its sides secured to the wing arms 15. In like manner wing H is fast on reinforcement wire 20 and wing arms 19.

Wings G and H which may be made of silk, canvas or other flexible material are cut wider at their rear edges so that when depressed they will have a tendency to form a scoop and to evade the air by falling in their frames when moved upward.

Solid bevel gear and crank arm shafts 7, which have bearings at inner sides of transmission frames 12 and are journaled in hollow bevel gear and crank arm shafts 6, are provided at their outer ends with crank arms 21 which connect by rods 22 to crank arms 23 of lower solid crank arm shafts 8, oscillated by eccentric discs 11 to which 8 are connected by crank arms 24 and eccentric rods 25.

Hollow bevel gear and crank arm shafts 6 which have bearings in outer sides of transmission frames 12, in hollow main bevel gear shafts 5 and in outer side of body 1, are provided at their outer ends with crank arms 26 which connect by rods 27 to crank arms 28 of lower hollow crank arm shafts 9, oscillated by eccentric discs 10 to which 9 are connected by crank arms 29 and eccentric rods 30.

It will thus be seen that wing frames 15—17'—15 are oscillated by eccentric discs 10 and wing frames 19—20—19 by eccentric discs 11.

The rotation and oscillation of wing frames 19—20—19 are controlled and operated as follows:

The motors 2 transmit power by means of bevel gears at both ends of motor shaft 3 to hollow main bevel gear shafts 5 to which they are connected by bevel gear drives 4, double diameter bevel gear on 5 for high speed motor, turning transmission frames 12 and eccentric discs 10 and 11 in a direction from above-forward.

The rotation of eccentric discs 10 cause oscillation of hollow crank arm shafts 9 to which they are connected by crank arms 29 and eccentric rods 30, and then of hollow bevel gear and crank arm shafts 6 to which 9 are connected by crank arms 28 and 26 and rods 27, and finally, of wing arm shafts 14 to which 6 are connected by like bevel gear and rod drives 16.

By this arrangement both wing arms 15 are forced to rotate and oscillate in unison.

The rotation of eccentric discs 11 cause oscillation of lower solid crank arm shafts 8 to which they are connected by crank arms 24 and eccentric rods 25, and then of solid bevel gear and crank arm shafts 7 to which 8 are connected by crank arms 23 and 21 and rods 22, and finally of wing arm shafts 19 to which 7 are connected by like bevel gear and rod drives 17.

By this arrangement wing arms 19 are forced to rotate and oscillate in unison, and wing frames 19—20—19 will oscillate in the opposite direction to that of wing frames 15—17′—15 as the former are oscillated by eccentric discs 11 and the latter by eccentric discs 10.

By the same arrangements wing frames 19—20—19 and 15—17′—15 are forced to oscillate in the opposite direction to that of the rotation of the transmission frames 12 during their downward movement, but in the same direction while being raised or to rotate and oscillate in a manner similar to that of the wings of a bird in flight, thus causing the wings to compress the air on the downward movement and by reason of their flexibility, elasticity as well as the looseness of their rear edges to evade the air on the upward movement.

The elasticity of rear parts of wing arms 15 and 19 also provides for the passage of air over the rear edges of the wings without resistance as well as an increased power of propulsion.

Steering in the horizontal plane is attained by operation of rudders placed at the rear of car or fuselage, not shown on drawing, in such positions as will enable them to catch the air currents thrown by the descending wings.

Steering in the vertical plane may be accomplished by the increase or decrease in the speed of the motors as well as by rudders in lighter machines.

What I claim is:

1. A flying machine, comprising a body having at each side separate parallel transmission frames rotatably mounted therein, said transmission frames being rotatable in a vertical plane and having at each end horizontal rotatable and oscillatable shafts mounted separately therein in pairs on a common longitudinal axis, said shafts having partially elastic parallel wing arms rigidly affixed thereto, flexible wings with taut or stiff front edges and loose rear edges mounted between each two wing arms at same ends of said transmission frames, means for rotating the transmission frames in unison and means for oscillating the wing arms in said transmission frames in such manner that their oscillation is in the opposite direction to that of the rotation of said transmission frames in their descent but in the same direction in their ascent.

2. A flying machine, comprising flexible and elastic wings with taut or stiff front edges and loose rear edges, mounted on and between partially elastic and parallel wing arms rigidly affixed to separate parallel shafts, oscillatably mounted in pairs on a common longitudinal axis at each end in separate parallel and in a vertical plane rotatable transmission frames, rotatably mounted in and at each side of a body, means for rotating the transmission frames in unison and means for oscillating the wing arms in the transmission frames in such manner that their oscillation is in the opposite direction to that of the rotation of the transmission frames in their descent but in the same direction in their ascent.

3. A flying machine, comprising flexible wings with taut or stiff front edges and loose rear edges, mounted on and between parallel wing arms rigidly affixed to parallel shafts, rotatably and oscillatably mounted in pairs on a common longitudinal axis at each end of separate parallel and in a vertical plane rotatable transmission frames, rotatably mounted in and at each side of a body, means for rotating the transmission frames in unison and means for oscillating the wing arms in the transmission frames in such manner that their oscillation is in the opposite direction to that of the rotation of the transmission frames in their descent but in the same direction in their ascent.

Signed at New York city in the county of Bronx and State of New York this 4th day of February A. D. 1927.

GUSTAF HEDÉN.